United States Patent [19]

McCreery et al.

[11] Patent Number: 4,685,844

[45] Date of Patent: Aug. 11, 1987

[54] CUTTING INSERT

[75] Inventors: James F. McCreery, Latrobe, Pa.;
Arthur D. Tilstone, Raleigh, N.C.

[73] Assignee: Kennametal, Inc., Latrobe, Pa.

[21] Appl. No.: 928,743

[22] Filed: Nov. 7, 1986

Related U.S. Application Data

[63] Continuation of Ser. No. 230,402, Jan. 30, 1987, abandoned.

[51] Int. Cl.$^4$ ............................................. B23B 27/22
[52] U.S. Cl. ..................................... 407/114; 407/115
[58] Field of Search ........................ 407/113, 114, 115

[56] References Cited

U.S. PATENT DOCUMENTS 3,792,515  2/1974  Lundgren ........................... 407/114
4,116,576  9/1978  Gawryk, Sr. ....................... 407/115

FOREIGN PATENT DOCUMENTS 2252349  5/1973  Fed. Rep. of Germany ...... 407/114
2357180  5/1975  Fed. Rep. of Germany ...... 407/114

Primary Examiner—Nicholas P. Godici
Assistant Examiner—Jerry Kearns
Attorney, Agent, or Firm—John J. Prizzi

[57] ABSTRACT

This invention pertains to an indexable and invertable cutting insert having cutting edges and a positive rake surface which appears convex when viewed in cross section.

2 Claims, 6 Drawing Figures

CUTTING INSERT

This is a continuation of co-pending application Ser. No. 06/230,402 filed on 01-30-81 and now abandoned.

BACKGROUND OF THE INVENTION

The present invention relates to cutting tools and, in particular, to indexable cutting inserts. More particularly, the present invention relates to those positive rake inserts which may be held in a toolholder designed to accept a negative rake insert, and which are invertable as well as indexable.

Positive rake inserts require less power and produce a better finish than negative rake inserts in most applications. They typically required a toolholder specifically designed to hold a positive rake insert and were not invertable. Negative/positive, or N/P, inserts were then developed. These N/P inserts, while retaining a positive rake surface, can be held in a toolholder designed to take negative rake inserts and can also be invertable. Examples of N/P insert designs are shown in U.S. Pat. Nos. 3,399,442 and 3,557,416, both assigned to applicant corporation.

In inserts having a positive rake surface, the end clearance face (or peripheral wall) and rake surface form an acute angle at the cutting edge. This structure produces an inherently weaker cutting edge than that found in negative rake inserts in which this included angle is 90 degrees or more. The cutting edges of positive rake and N/P inserts are, therefore, subject to a greater degree of crumbling than encountered in negative rake inserts.

In those N/P inserts which are invertable, the cutting edge and positive rake surface directly below the cutting edge doing the cutting are typically not in abutment with the anvil of the toolholder seat in order to avoid damage to the lower cutting edge. This unsupported portion of the insert, especially in the corner or nose area, is thereby subjected to a bending moment which can lead to early failure of the nose area.

BRIEF SUMMARY OF THE INVENTION

The present invention seeks to overcome the above-mentioned problems associated with the prior art positive rake cutting inserts. In accordance with the present invention, a molded cutting insert, preferably of a cemented carbide material, having a high temperature oxide, nitride, and/or carbide coating, is provided with a convex positive rake surface behind its cutting edge. The insert may be indexable and also invertable.

Preferably, located in the nose area on indexable inserts according to the present invention is a rising structure, or nose support member, behind the cutting edge which serves as a chip control device at low depths of cut and also increases the strength in the nose area of the insert so as to minimize breakage of the nose cutting edge.

In addition, this support member acts to lift chips up in the nose area, reducing wear on the flank cutting edge. On invertable inserts, the rising structure preferably has a height greater than the height of the cutting edge so that it, rather than a cutting edge, is abutted against the insert seat on the toolholder and bears the cutting loads.

It is also a preferred embodiment of the present invention that the rising structure make its closest approach to the cutting edge in the nose area so as to provide maximum support to the nose cutting edge. As the cutting edges extend away from the nose, it is preferable that the rising structure recede away from the cutting edge relatively quickly so as to minimize its effect on power requirements at high depths of cut. The rising structure, as it recedes away from the nose area, may join a centrally located island area.

Preferably, located between the cutting edges and the centrally located island is a basin floor which is convex having an upward slope which increases as it extends away from the cutting edge. The basin floor preferably joins a wall of the island such that its upward slope is greater than the slope of the wall at the juncture.

While these chip control and support structures located behind the cutting edge are most advantageously used with positive rake inserts, it is within the scope of the present invention that these structures may also be used with any of the other rake surface designs (positive, negative and neutral) within the skill of those skilled in the art.

Therefore, an object of the present invention is to provide cutting inserts, with improved cutting edge strength, and having efficient cutting characteristics over a wide range of speeds, feeds and depths of cut.

It is also an object of the present invention to provide invertable positive cutting inserts with improved nose strength.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
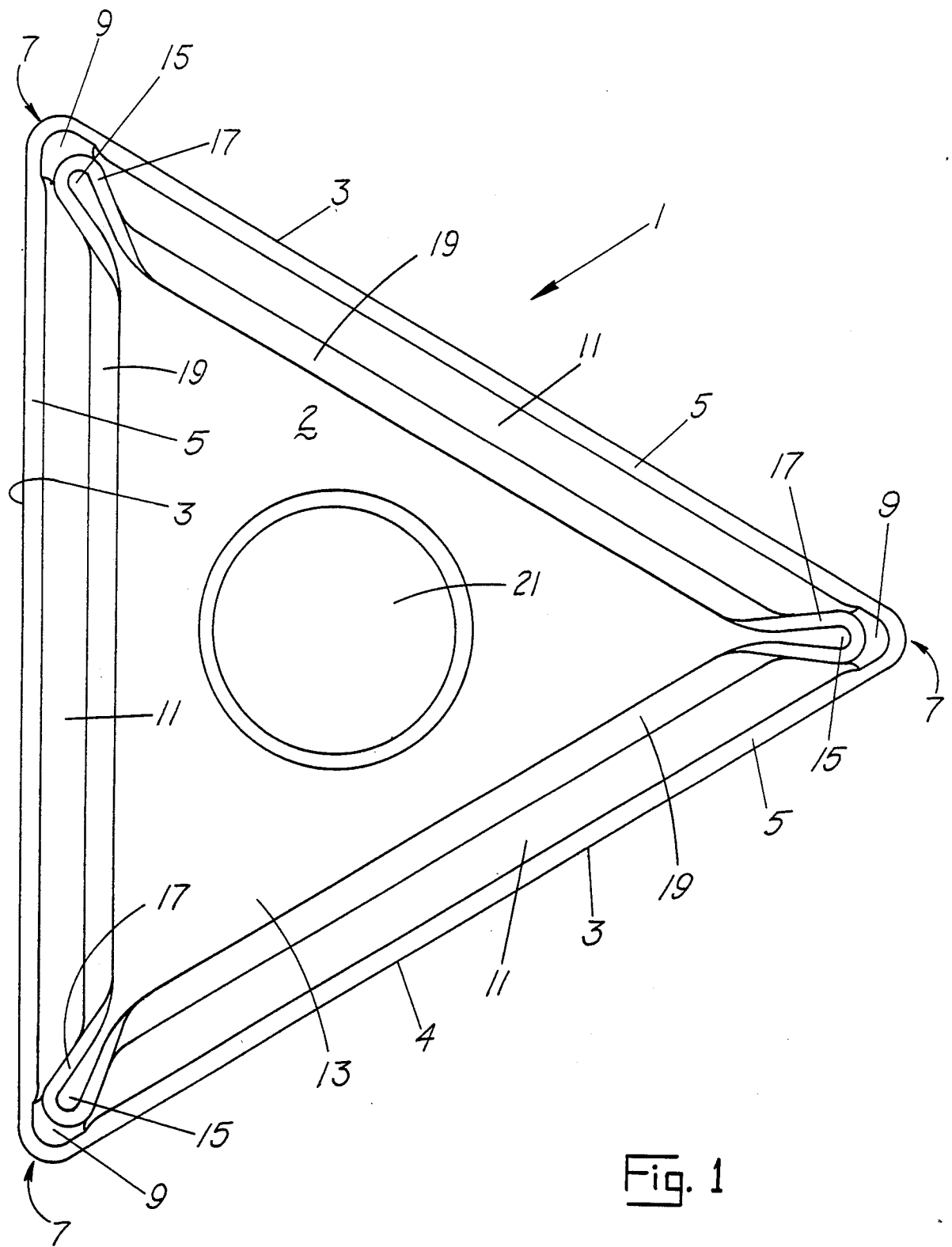
FIG. 1 is a top plan view of a preferred embodiment of the cutting insert according to the present invention.

Referring to the drawings somewhat more in detail, FIG. 1 shows a top plan view of a generally polygonal indexable cutting insert. The cutting insert 1 has a cutting edge 3 formed where the peripheral wall 4 meets the top surface 2 of the cutting insert. Extending inwardly from the cutting edge 3 on the top surface 2 is a convex positive rake surface 5. This rake surface 5 is followed by a basin or floor area.

There is a nose basin 9 in the corner or nose areas 7 and there is a concave basin 11 along the sides of the insert. In the nose areas 7 inwardly of the nose basin 9 there is a nose support member 15 which rises up from the floor of the nose basin. It has a nose support member wall 17 which is also generally convex in nature. The nose support member 15 may be joined to a centrally located island 13 as shown. Along the sides of the insert, the concave basin 11 joins an island wall 19 which rises up to the top surface of the centrally located island 13. Also centrally located on the top surface 2 is an aperture 21 which communicates with the bottom surface of the insert. The bottom surface of the insert may be flat or may repeat the features shown on the top surface 2 if invertability of the insert is desired.

Figure 2:
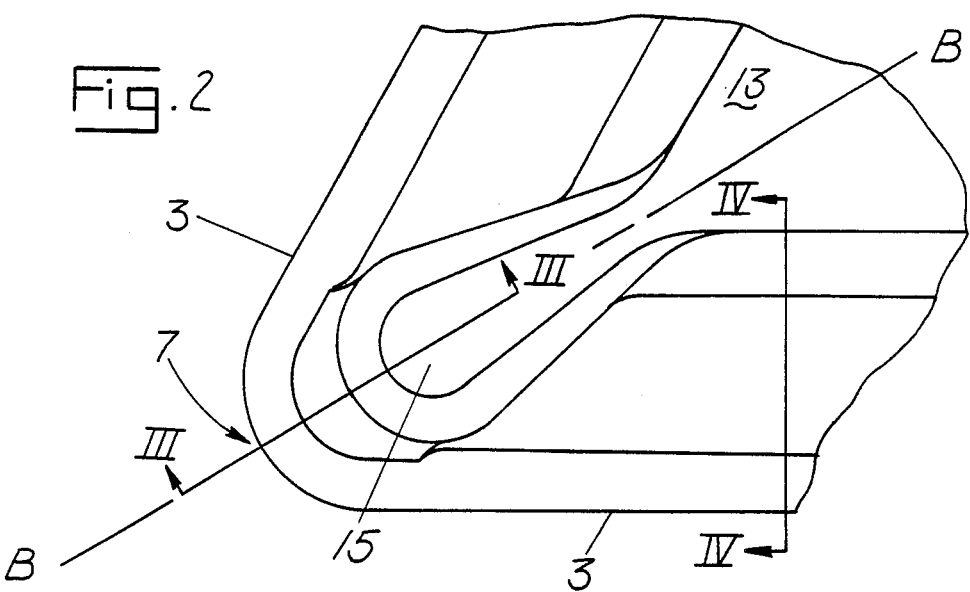
FIG. 2 is a close-up of a corner segment from the view of the insert shown in FIG. 1.

Viewing FIG. 2, which is a blow up of one of the nose areas 7 shown in FIG. 1, it can be seen that the nose support member 15 is closest to the cutting edge in the nose area 7 and then, as the cutting edges 3 extend away from the nose area 7, the nose support member 15 rapidly moves farther away from the cutting edges 3. As is shown in FIG. 2, this is achieved by tapering the nose support member 15 such that its width around the bisector B—B of the nose angle decreases as one moves inwardly from the nose area 7 cutting edge. While this is the preferred embodiment, the width of the nose support member may remain constant as it moves away from the nose area along bisector B—B until it joins the centrally located island 13.

Figure 3:
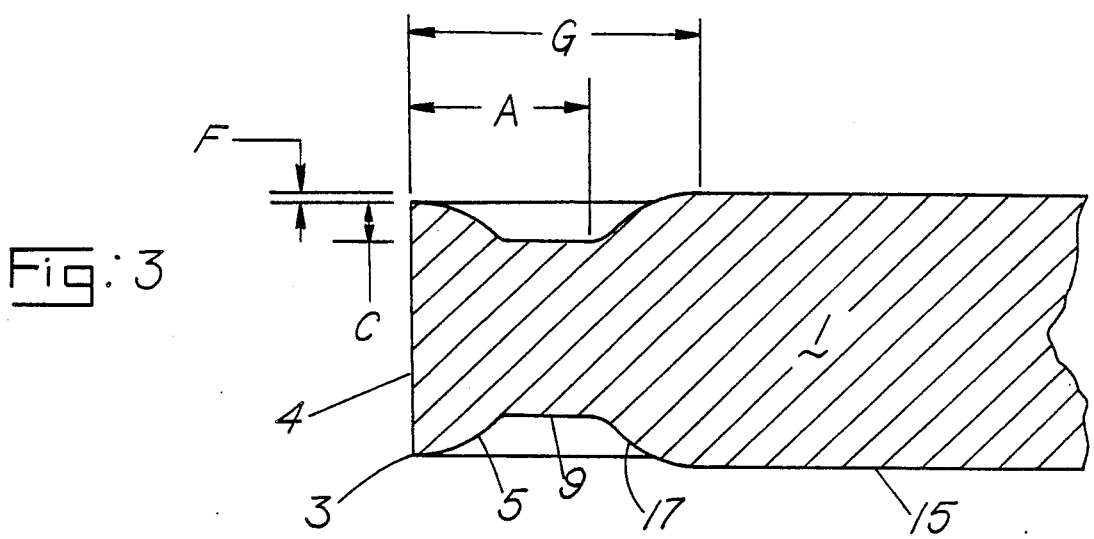
FIG. 3 is a cross section of the corner area shown in FIG. 2 viewed along arrows III—III.

Viewing FIG. 3, which is a cross section taken along arrows III—III in FIG. 2, it can be seen that the cutting edge 3 which is formed at the junction of the peripheral wall 4 and the convex positive rake surface 5 is located at a lower height than the height of the nose support member 15. This difference in height, shown as F in FIG. 3, is typically one to two mils and is provided so that the cutting forces will not damage the lower cutting edge which is opposite the cutting edge doing the cutting by abutting the lower cutting edge against the bottom surface of the insert seat on the toolholder. Of course, this increased height of the nose support 15 is only required on invertable inserts. In inserts that are only indexable, the height of the nose support member 15 may be the same as, or less than, that of the cutting edge. The nose support member 15, on deep cuts, also serves to lift the chip up in the nose area 7 to minimize cratering damage that would otherwise be done to the flank cutting edge and rake surface tending to further weaken the nose area 7.

As can also be seen in the drawing, the convex descending wall 5 merges into a planar basin floor 9 which is then followed by a generally convex nose support member wall 17. As also shown in the drawing, there may be fillets between the positive rake surface 5 and the basin 9 and also between the basin 9 and the nose member support wall 17. In order to maximize the support that the nose support member 15 provides to the cutting edge 3 in the nose area, the nose member 15 should be brought as close as possible to the cutting edge 3 commensurate with also maintaining cutting power requirements within acceptable limits.

It has been found that the distance from the cutting edge 3 to the inward edge of the basin floor 9 shown in the drawing as dimension A should be preferably approximately 25 mils. However, it is believed that distance A will also provide acceptable results if it is held within 20 to 70 mils of the cutting edge. The distance from the cutting edge 3 to the crest of the nose support member 15 shown as dimension G provides acceptable results when dimension G equals 38 mils, but it is also believed that dimension G can be held between 35 and 90 mils and still provide good chip control.

The height of the cutting edge 3 above the basin floor 9 shown as dimension C should be between 3 and 10 mils and, preferably, held to approximately 5 mils.

Figure 4:
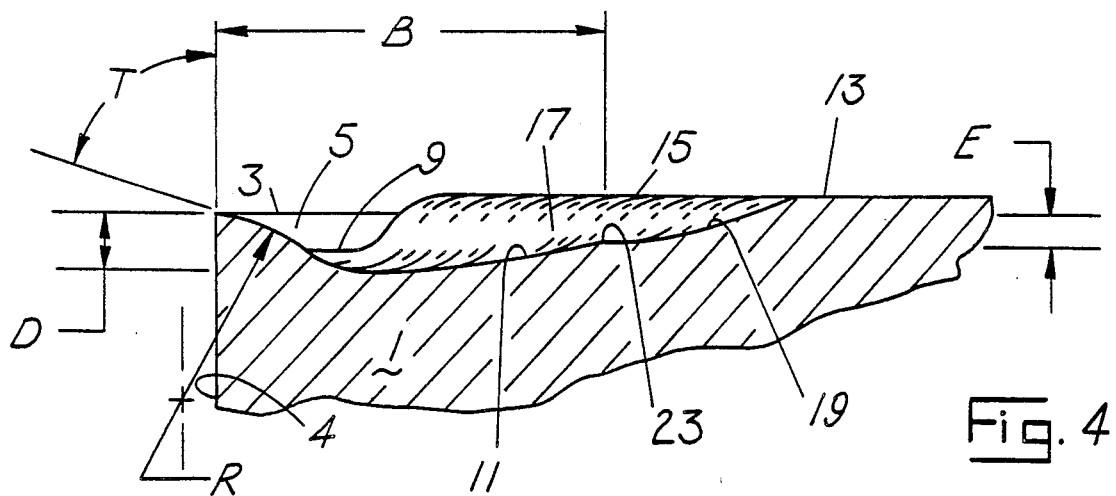
FIG. 4 is a cross section of the insert shown in FIG. 2 viewed along arrows IV—IV.

Viewing FIG. 4, which is a view taken along arrows IV—IV of FIG. 2, it can be seen that the cutting insert 1 has a peripheral wall 4 at the top of which is a cutting edge 3. Joining the cutting edge is a convex descending wall 5 which may be an arc of a circle having a radius R. Along the sides, it can be seen that this convex descending wall 5 joins a concave basin floor 11 whose slope preferably increases as it extends away from the cutting edge 3.

The concave basin floor 11 meets with an island wall 19 located inwardly of it at position 23. As shown in this figure, the slope of the basin floor 11, at a position 23, should be greater than the slope of the island wall 19 at position 23. Island wall 19 may be concave, as shown, or any other configuration, as long as its slope at position 23 is smaller than that of the basin floor 11 at position 23.

The nose support member 15 convex wall 17 blends into the basin floor 11 and the island wall 19. The basin floor 9 in the nose area is slightly elevated above the convex basin floor 11. The convex basin floor 11 should have a maximum depth, D, of 8 to 15 mils and has been found to produce acceptable results when held at approximately 8 mils. The concave basin floor 11 rises as it extends from the cutting edge, rising to a maximum height E at point 23. E is preferably 3 to 10 mils below the height of the cutting edge, but always smaller than D.

The angle that a tangent to the positive rake convex surface 5 makes with the peripheral wall 4 at the cutting edge, is shown at angle T in FIG. 4. T may be approximately 82 degrees, but can be changed depending upon the cutting edge strength requirements for particular applications. The compliment of angle T is the rake angle and, as can be seen, the rake angle continuously increases as the positive rake convex surface extends away from the cutting edge 3.

The cusp 23 should be approximately 50 to 100 mils (B) behind the side cutting edge 9 and has been found to produce acceptable results when held at 50 mils. The cusp, or line 23, acts as a chip control device at deep depths of cut.

It should be noted that, while the drawings show the nose support member 15 and the central island 13 as being at the same height, and, also, being above the height of the cutting edge 3, this is not strictly necessary if the insert is not an invertable insert. This design is only required on invertable inserts.

Figure 5:
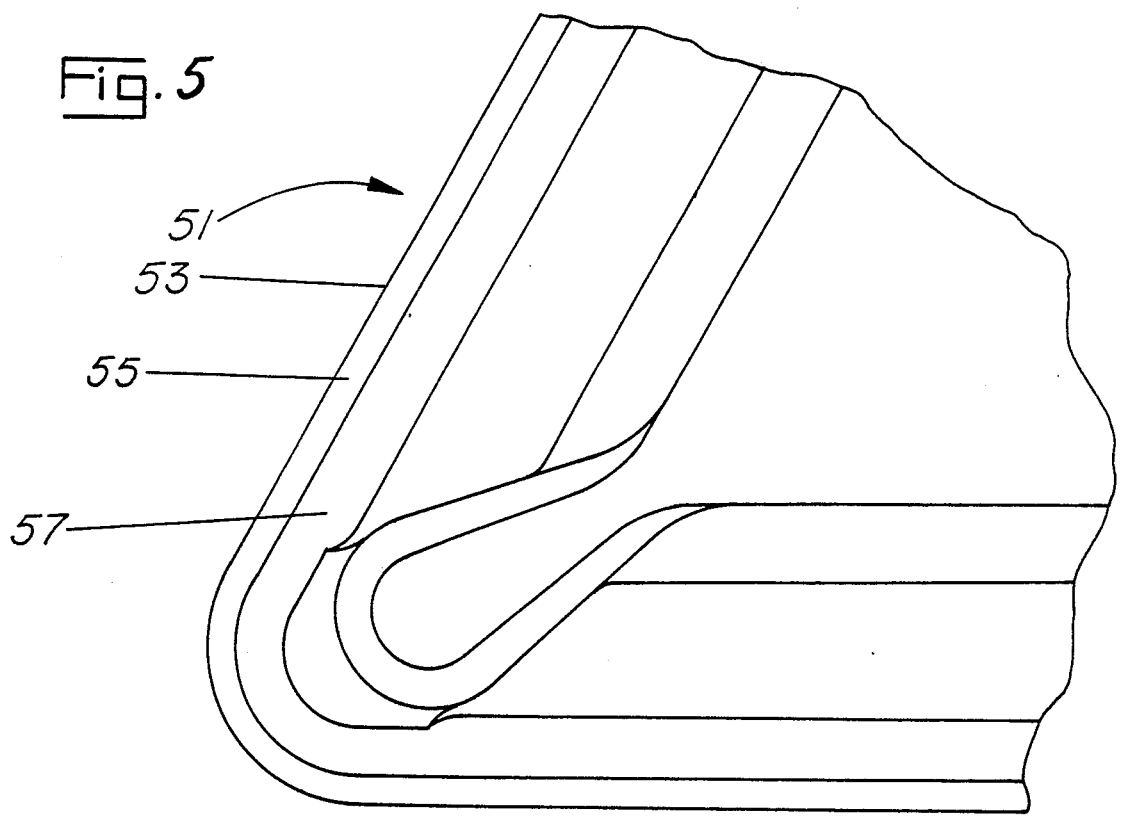
FIG. 5 is a fragmentary top plan view of another embodiment of the present invention.
Figure 6:
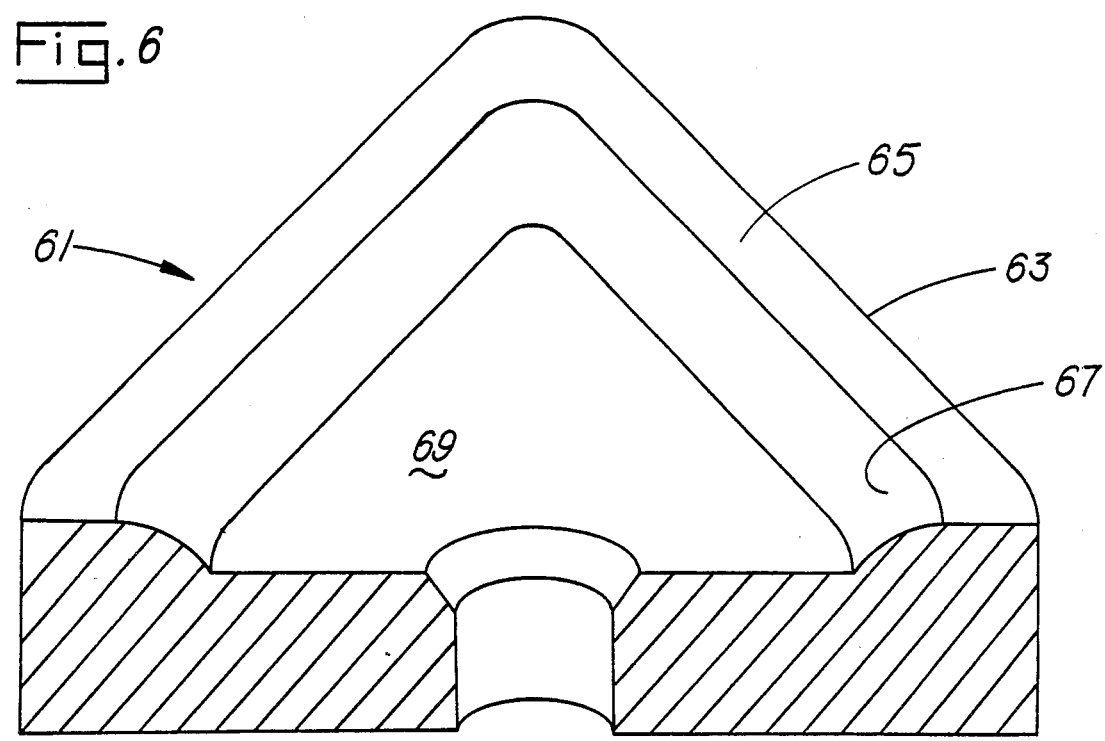
FIG. 6 is a sectionalized perspective view of still another embodiment of the present invention.

FIGS. 5 and 6 show two alternate embodiments of the present invention. In FIG. 5, a cutting insert 51 has a cutting edge 53 at the junction of its peripheral wall and its top surface joined to a planar land 55 extending inwardly of it. Descending from the land 55 is a descending wall 57 which is preferably a convex positive rake surface as has been described before in the preceding figures. This descending wall 57 may, however, be concave or planar, depending upon the application.

The structure located inwardly of the descending wall is the same as that previously described in FIGS. 1 to 4. The land 55 may have a positive, negative or neutral rake, depending upon the application and is provided in this embodiment to further increase the edge strength of the insert.

FIG. 6 shows an insert 61 having a cutting edge 63 with a land 65 extending inwardly from the cutting edge. At the inward edge of the land 63 is a convex positive rake surface 67 which descends down to a floor 69 which extends inwardly without meeting any rising chip control structures.

The embodiments described are provided as a means of illustrating the many possible insert designs within the scope of the present invention and are not intended to limit that scope. Modifications within the scope of the following claims may be made and are included in the present invention.

What is claimed is:

1. An indexable cutting insert comprising: a body having a top surface, a bottom surface and a peripheral wall joining said top and bottom surfaces; at least two angularly related and joined cutting edges formed at the juncture of said peripheral wall with one of said top and bottom surfaces; said one of said top and bottom surfaces having a positive rake surface adjoining said cutting edge; said positive rake surface forming a positive rake angle at the cutting edge which continuously increases as said positive rake surface extends inwardly from said cutting edge; a basin floor located inwardly of said positive rake surface; and an island located inwardly of said basin and raising above said cutting edge; said insert is invertable; said basin floor comprises a surface which rises as it extends inwardly from said cutting edge; said basin floor joins a rising wall forming a part of said centrally located island, and at said juncture of said basin floor said rising wall the upward slope of said basin floor is greater than the edge of said rising wall at said juncture.

2. A cutting tool comprising: a cutting edge; a positive rake surface behind and joined to said cutting edge; a positive rake angle on said positive rake surface continuously increases as said rake surface extends away from said cutting edge; a basin floor located inwardly of said positive rake surface; an island located inwardly of said basin and raising above said cutting edge; said basin floor comprises a surface which rises as it extends inwardly from said cutting edge; said basin floor joins a rising wall formig a part of said centrally located island, and at said juncture of said basin floor and rising wall the upward slope of said basin floor is greater than the edge of said rising wall at said juncture.

* * * * *